(12) United States Patent
VandenBoom

(10) Patent No.: US 6,331,849 B1
(45) Date of Patent: Dec. 18, 2001

(54) INTEGRATED SURFACE-MOUNT POINTING DEVICE

(75) Inventor: Robert M. VandenBoom, Markle, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/258,513

(22) Filed: Feb. 25, 1999

(51) Int. Cl.⁷ ........................................ G01L 1/22
(52) U.S. Cl. .................... 345/161; 345/168; 345/157; 345/158
(58) Field of Search .................... 345/161, 168

(56) References Cited

U.S. PATENT DOCUMENTS

| | | |
|---|---|---|
| Re. 35,016 | 8/1995 | Gullman et al. . |
| 4,680,577 | 7/1987 | Straayer et al. . |
| 4,825,019 | 4/1989 | Fisher . |
| 4,876,524 | 10/1989 | Jenkins . |
| 4,905,523 | 3/1990 | Okada . |
| 4,967,605 | 11/1990 | Okada . |
| 4,969,366 | 11/1990 | Okada . |
| 5,263,375 | 11/1993 | Okada . |
| 5,325,081 * | 6/1994 | Roberts ................................. 338/2 |
| 5,407,285 | 4/1995 | Franz . |
| 5,473,347 | 12/1995 | Collas et al. . |
| 5,489,900 | 2/1996 | Cali et al. . |
| 5,521,596 * | 5/1996 | Selker et al. ........................ 341/22 |
| 5,541,622 | 7/1996 | Engle et al. . |
| 5,579,033 * | 11/1996 | Rutledge et al. .................... 345/161 |
| 5,659,334 | 8/1997 | Yaniger et al. . |
| 5,689,285 * | 11/1997 | Asher ................................... 345/161 |
| 5,694,123 | 12/1997 | Selker et al. . |
| 5,712,660 | 1/1998 | Martin . |
| 5,754,166 | 5/1998 | Baba . |
| 5,754,167 | 5/1998 | Narusawa et al. . |
| 5,767,840 * | 6/1998 | Selker . |
| 5,966,117 * | 10/1999 | Seffernick et al. .................. 345/161 |
| 6,002,388 * | 12/1999 | Seffernick et al. .................. 345/161 |
| 6,121,954 * | 9/2000 | Seffernick ........................... 345/161 |
| 6,137,475 * | 10/2000 | Ginn et al. . |

* cited by examiner

Primary Examiner—Bipin Shalwala
Assistant Examiner—Vincent E. Kovalick
(74) Attorney, Agent, or Firm—Alvin Wirthlin; Mark P. Bourgeois; Mark W. Borgman

(57) ABSTRACT

An integrated, surface-mount pointing device for controlling the movement of an object on a display screen, comprises a base member; a shaft mounted in the base member; a sensor mounted on the shaft for sensing the amount of strain in the shaft in response to an applied force on the shaft; and a pair of spaced electrical leads extending at least partially through the base member. Each electrical lead has an inner terminal end electrically connected to the sensor and an outer terminal end extending outwardly of the base member. The outer terminal ends of the pair of leads are shaped for mounting on the surface of a circuit board. The circuit board may contain electrical traces and electronic circuitry for processing signals from the sensor. More than one sensor with additional electrical leads may be provided.

20 Claims, 7 Drawing Sheets

INTEGRATED SURFACE-MOUNT POINTING DEVICE

CROSS REFERENCE TO RELATED APPLICATIONS

This invention is related to U.S. patent application Ser. No. 08/717,517 filed on Sep. 23, 1996, entitled "Collar Mounted Pointing Stick," and U.S. patent application Ser. No. 08/756,202 filed on Nov. 25, 1996, entitled "Z-Axis Sensing Pointing Stick with Base as Strain Concentrator," the disclosures of which are hereby incorporated by reference.

BACKGROUND OF THE INVENTION

1. Field of the Invention

This invention generally relates to a pointing device for controlling the positioning, movement and operation of a cursor on a display screen associated with a computer and, more particularly, to an integrated pointing device that is mountable to a printed circuit board.

2. Description of the Related Art

Various devices are well known for controlling cursor movement over a display screen associated with a computer. Depending on the type of computer program in operation, the position of the cursor on a display screen may indicate a choice of computer commands on a menu associated with the computer program displayed on the display screen menu. One such device is a "mouse" which has a ball mounted to its underside for contacting a horizontal surface and rolling therealong when manipulated by a computer operator. The X- and Y-axis components of movement are sensed and transmitted through a connecting cable to a serial input port of the computer. This signal to the computer is varied by the amount and direction of mouse ball movement, and causes a corresponding movement of the cursor on the display screen. Typically a pair of "mouse" or "click" buttons are located on the top of the mouse at the forward end thereof. The buttons permit a computer operator to enter a selection or other command to the computer (the command typically being shown by the position of the cursor on the displayed menu) upon pressing one or the other or both buttons, depending upon the software associated with the mouse. Such a device, which is separate from the computer console and keyboard, requires a connection to a computer port and a flat, horizontal supporting surface for proper operation. Furthermore, the computer operator must completely removed one hand from the computer keyboard in order to move the mouse and thus the cursor on the display screen and then reposition the hand again over the keys of the keyboard to resume data entry.

Another cursor controlling and signaling mechanism is a "joystick" which, like the mouse, is completely separated from the computer console and keyboard. The joystick is typically an elongated, upright stick that extends upwardly from a base connected to the computer console by means of an electrical cable. The joystick is operated by tilting the upright stick in various directions to cause the cursor or other display element to move on the display screen in a direction and usually at a speed corresponding to the direction and pressure exerted on the stick by the computer operator. The operation of a joystick, however, frequently requires that both hands be moved from the computer keyboard, with one hand holding the base and the other hand manipulating the joystick. A "click" button is usually located on the joystick. Although a mouse or joystick can be used with a portable "laptop" or "notebook" sized computer, such devices are cumbersome, since they must be carried separately and connected to the computer before use. Moreover, such devices are not suitable for operation during travel.

A "trackball" is still another type of known cursor controlling device. This device, which in essence is an inverted mouse, includes a rotatable ball mounted within a housing. The ball is rotated by a finger, thumb or palm of the computer operator, and the X- and Y-components of movement are sensed and input into the computer with corresponding movement of the cursor across the display screen. "Mouse" or "click" buttons are usually located on the trackball housing, although with some models a selection signal is input by pressing the "enter" key on the standard keyboard. This type of pointing device has been somewhat useful with portable computers because it can be temporarily affixed to one side of the computer case for manipulation by one hand of the computer operator. However, although trackball devices can be removably mounted to the computer case, they still required attachment before use and removal after use and repositioning of the computer operator's hand during use. It is also noted that some trackball's are built into the computer keyboard. Nonetheless, these trackball's required a separate set of "click" buttons for selection of items on the display monitor.

Manufactures of portable laptop computers, recognizing the need for placing the cursor controlling device in a permanent and more convenient location, have more recently installed a small, stubby button-like joystick at a central position on the computer keyboard, such as at the juncture of the "g," "h" and "b" keys of the standard "QWERTY" keyboard. The button-like joystick, also known as a pointing stick, is sensitive to lateral pressure, the amount and direction of which are sensed and input into the computer to cause movement of the cursor, with the speed and direction of cursor movement corresponding to the amount and direction of pressure on the pointing stick. In order to select items on the display screen, upwardly extending "mouse" or "click" buttons must be provided somewhere on the computer, typically at a location remote from the pointing stick. This, as with the previously described cursor control devices, is disadvantageous since the hand and fingers of the computer operator must be repositioned in order to actuate the buttons and then be moved again to the proper keyboard position for typing.

Another disadvantage associated with a keyboard-mounted pointing stick is that a communication cable must extend from the pointing stick to a circuit board that provides a power source, amplifiers, and calibration electronics for the pointing stick. The circuit board is spaced from the pointing stick and care must be exercised when installing the cable therebetween. Moreover, the materials that make up the cable, its process of forming and method of attachment to the pointing stick contribute to increased overall cost of the pointing stick.

Examples of patents related to the present invention are as follows, wherein each patent is herein incorporated by reference for related and supporting teachings:

U.S. Pat. No. Re. 35,016 discloses a three-axis force measurement stylus.

U.S. Pat. No. 5,754,167 discloses a coordinate input device for a computer keyboard, wherein signals from the input device are transmitted to a separate control section by way of a flexible cable.

U.S. Pat. No. 5,754,166 discloses a coordinate input device for a computer keyboard. The input device has a pointing stick with heat-shrinkable tubing installed therearound for affixing strain sensors on the side surfaces of the pointing stick.

U.S. Pat. No. 5,712,660 discloses a cursor control stick for mounting in a computer keyboard. The control stick has a slidable plunger for generating Z-axis signals for selection of an item on a computer screen.

U.S. Pat. No. 5,659,334 discloses a pointing stick with a concave lower surface that rides on a force-sensing resistor network for sensing direction of pointing stick tilt.

U.S. Pat. No. 5,489,900 discloses a force sensitive transducer for use in a computer keyboard.

U.S. Pat. No. 5,325,081 discloses a supported strain gauge and joy stick assembly and method of making.

U.S. Pat. No. 5,263,375 discloses a contact detector using resistance elements and its application.

U.S. Pat. No. 4,905,523 discloses a force detector and moment detector using resistance elements.

U.S. Pat. No. 4,876,524 discloses an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

The foregoing patents reflect the state of the art of which the applicant is aware and are tendered with the view toward discharging applicants' acknowledged duty of candor in disclosing information that may be pertinent in the examination of this application. It is expressly stipulated, however, that none of these patents teach or render obvious, singly or when considered in combination, applicants' claimed invention.

SUMMARY OF THE INVENTION

It is a feature of the present invention to provide a pointing stick for controlling cursor movement on a display screen of a computer system.

It is a further feature of the present invention to provide an integrated pointing stick device for controlling cursor movement on a display screen of a computer system that is mountable to a surface of a circuit board.

According to one embodiment of the invention, an integrated, surface-mount pointing device for controlling the movement of an object on a display screen, comprises a base member; a shaft having a first end and a second end, with the first end mounted in the base member; a first sensor mounted on the shaft for sensing the amount of strain in the shaft in response to an applied force on the shaft in at least a first direction; and a first pair of spaced electrical leads extending at least partially through the base member. Each electrical lead has an inner terminal end electrically connected to the first sensor and an outer terminal end extending outwardly of the base member. The outer terminal ends of the first pair of leads are shaped for mounting on the surface of a circuit board.

According to a further embodiment of the invention, a keyboard for entering data in an information system comprises at least two keys located on the keyboard; a shaft located between the at least two keys and extending upward toward a top surface of the keys; a first sensor mounted on the shaft for sensing the amount of strain in the shaft in response to an applied force on the shaft in at least a first direction; a circuit board mounted in the keyboard in the vicinity of the two keys; a base member positioned below the at least two keys, with a lower end of the shaft being mounted in the base member; and a first pair of spaced electrical leads extending at least partially through the base member. Each electrical lead has an inner terminal end electrically connected to the first sensor and an outer terminal end extending outwardly of the base member. The outer terminal ends of the first pair of leads are mounted on a surface of the circuit board. The circuit board may contain electrical traces and electronic circuitry for processing signals from the sensor.

There has thus been outlined the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as of basis for designing other structures, methods and systems for carrying out the several purposes of the present invention. It is important, therefore, that the claims are regarded as including such equivalent constructions since they do not depart from the spirit and scope of the present invention.

It is noted that the drawings of the invention may not necessarily be to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENTS

Figure 1:
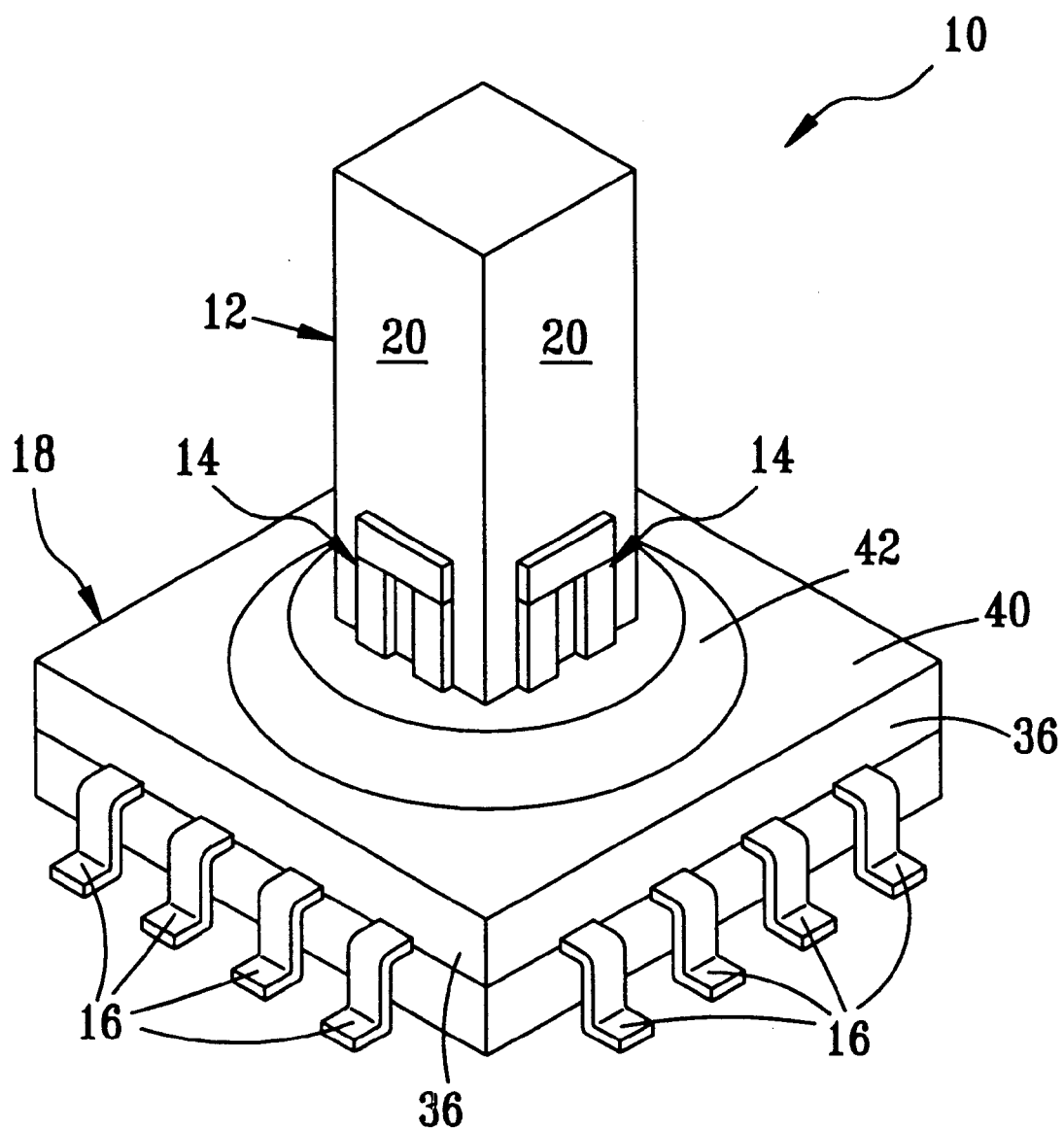
FIG. 1 is an isometric view of an integrated surface-mount pointing device according to a first embodiment of the invention.
Figure 2:
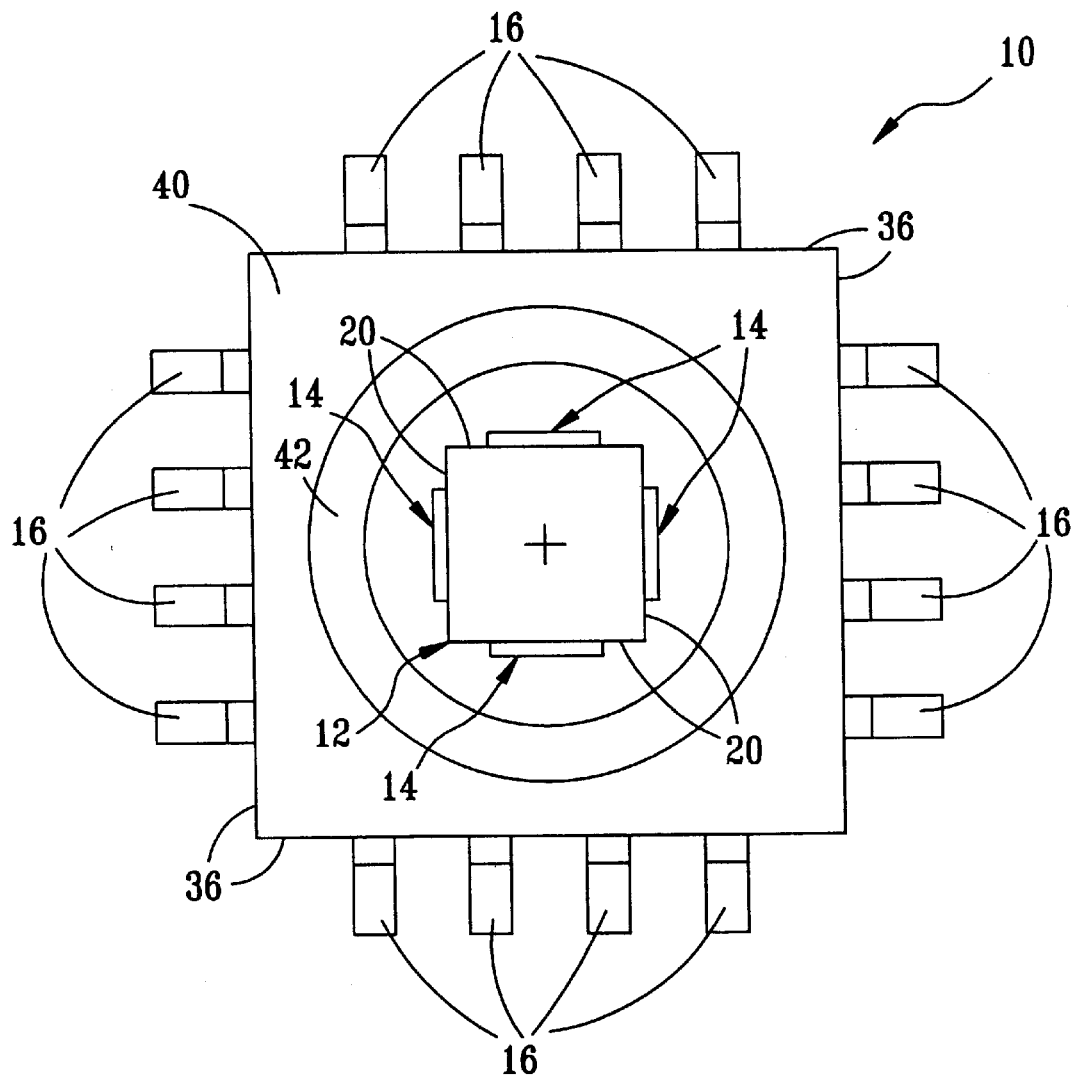
FIG. 2 is a top plan view of the integrated pointing device of FIG. 1.

With reference now to the drawings, and to FIGS. 1 and 2 in particular, an integrated surface-mount pointing device 10 that can be used to control the movement of a curser on a computer screen (not shown) is illustrated. In particular, the pointing device 10 comprises an upright pointing stick or shaft 12, strain gauge sensors 14 located on the sides 20 of the stick 12, outer terminals 16 electrically connected with the strain gauge sensors 14, and a body 18 for supporting the stick 12 and the outer terminals 16.

Figure 3:
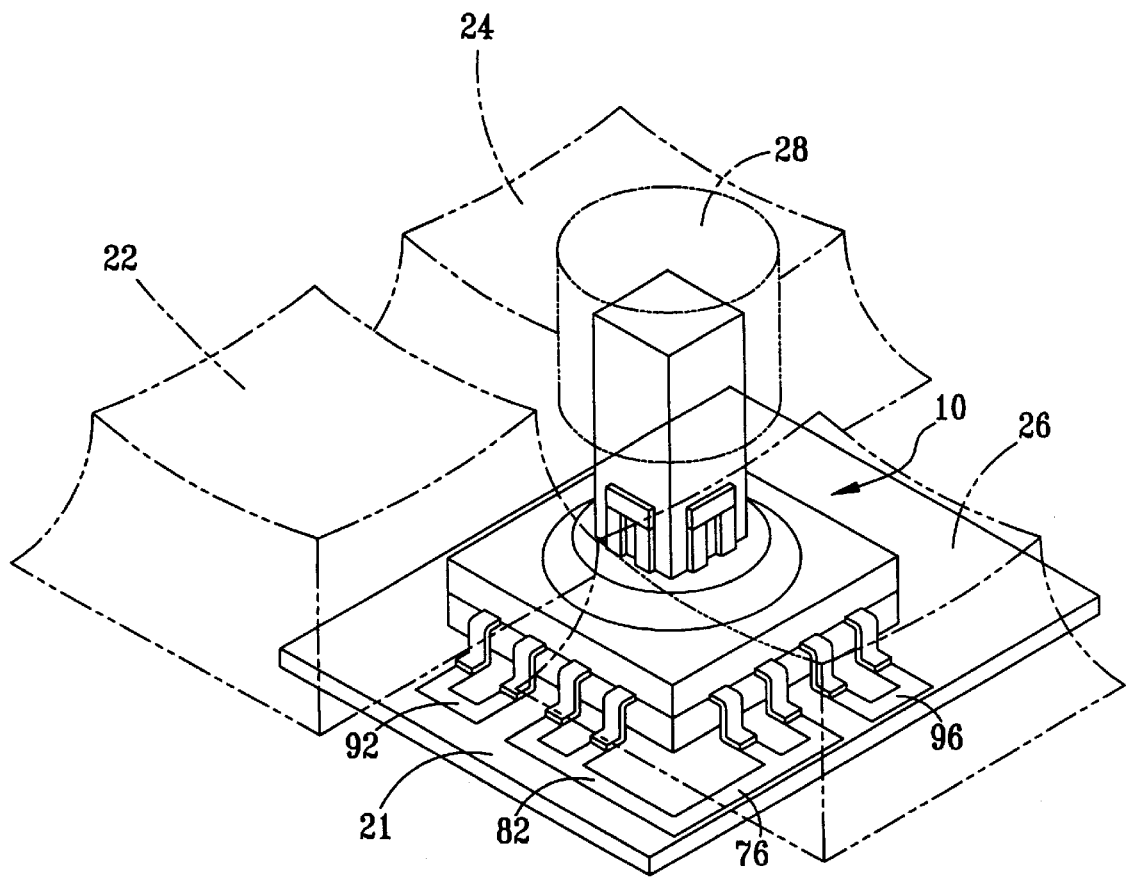
FIG. 3 is an isometric view of the integrated pointing device mounted on a computer keyboard.

As shown in FIG. 3, the pointing device 10 is surface-mounted on a printed circuit board 21 using well-known techniques. The circuit board 21 is in turn installed in a typing keyboard having a plurality of keys, such as keys 22, 24 and 26 (shown in phantom line) representative of letters, numerals, and/or symbols. Preferably, the keyboard is of the standard "QWERTY" type and the circuit board is mounted in the keyboard at a location such that the pointing stick 12 is positioned at the juncture between the "G" key 22, the "H" key 24, and the "B" key 26. Although this is the preferred location for the stick 12, it is to be understood that the pointing device 10 can be mounted at other locations, either on or off the keyboard. A resilient cap 28 (shown in phantom line), which may be formed of rubber-like material, is positioned over the top of stick 12 to increase the ease of operating the stick. The cap is sized to receive a single finger of an operator for controlling cursor movement on a computer screen in response to pressure exerted against the cap (and consequently the stick 12) in a desired cursor direction. The finger pressure causes strain in the stick 12 that is sensed by the strain gauges 14.

Referring again to FIGS. 1 and 2, the pointing stick 12 may be constructed of electrically insulative material, such as alumina or other ceramic. In the embodiment illustrated, the stick 12 is substantially square in cross section and formed with four side surfaces 20 for receiving the strain gauges 14. Although alumina is the preferred material for the pointing stick 12, it is contemplated that other suitable materials, such as plastics, epoxy resin, metals, or the like, can be used.

Figure 4:
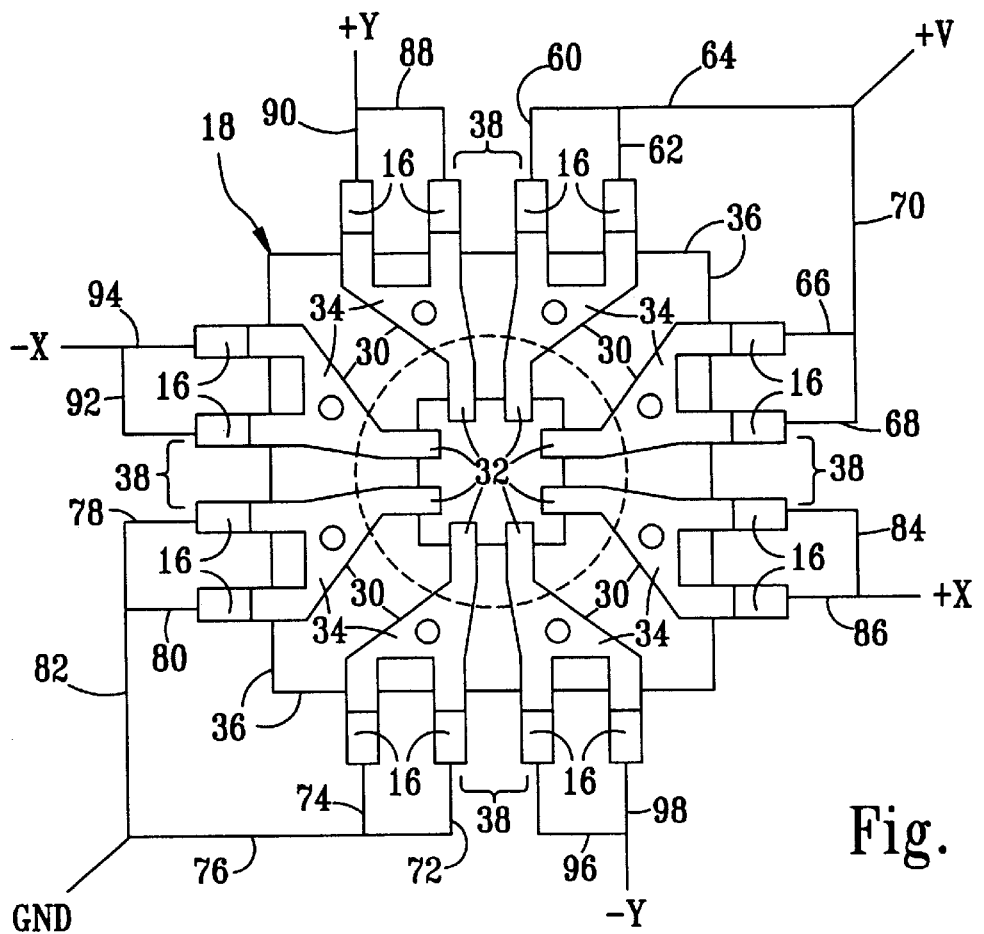
FIG. 4 is a cross sectional plan view of the integrated pointing device of FIG. 1 with the pointing stick removed for clarity.
Figure 5:
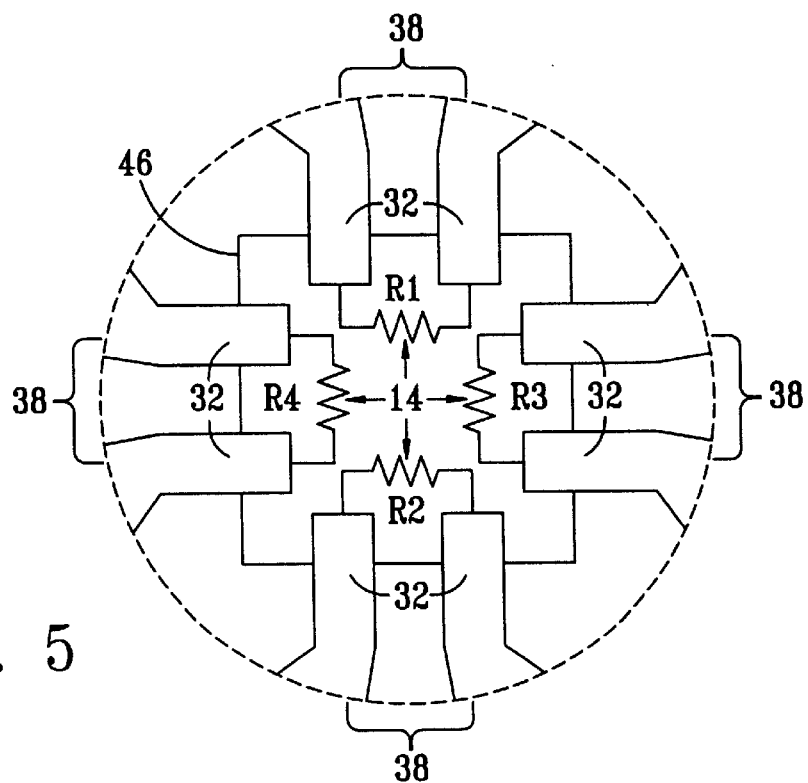
FIG. 5 is an enlarged cross sectional view within the dashed circle of FIG. 4.

With additional reference to FIGS 4 and 5, the outer terminals 16 are formed in pairs on a lead 30. Each lead 30 comprises one pair of outer terminals 16 and an inner terminal 32 separated by a middle section 34. Each of the inner terminals preferably extends into an opening 46 in the body 18, but can terminate at the edge of the opening or proximal thereto. Preferably, eight leads 30 are arranged around a central axis of the body 18, with a pair 38 of leads 30 arranged on each side 36 of the body 18 such that four outer terminals 16 project outwardly and downwardly from each side. The leads 30 in each lead pair 38 are preferably mirror images of each other. Arrangement of the leads 30 in this fashion offers several advantages. Since only the outer terminals 16 are in contact with the printed circuit board (PCB), the number of outer terminals 16 is related to the holding strength of the device 10 on the PCB. A larger number of outer terminals permits the use of smaller and thinner leads and increased holding strength than if fewer terminals are used. Consequently, greater resistance to separation of the pointing device 10 from the PCB is realized, especially during operation of the pointing stick 12 where forces may be generated in the X, Y and Z axes, or any combination thereof. The symmetrical orientation of the outer terminals 16 contributes to symmetrical loading along these axes when the pointing stick 12 is operated and facilitates alignment of the pointing device 10 with the printed circuit board during the mounting operation. With the use of smaller and thinner leads, the outer terminals 16 can be formed with a relatively small bending radius to thereby form a relatively small footprint for the pointing device 10. The leads may initially be pre-formed in their proper orientation as part of a lead frame (not shown) for facilitating automatic assembly of the integrated pointing device 10. Although four outer terminals 16 are shown on each side 36 of the body 18, more or less outer terminals may be formed, depending on the number of strain gauges 14, the amount of holding strength desired, and so on.

The outer terminals 16 of the leads 30 are shown in FIG. 1 with a gull-wing shape, but may be formed into any shape so as to be attachable to a printed circuit board, including, but not limited to J-lead, thru-hole and butt terminal shapes.

Figure 6:
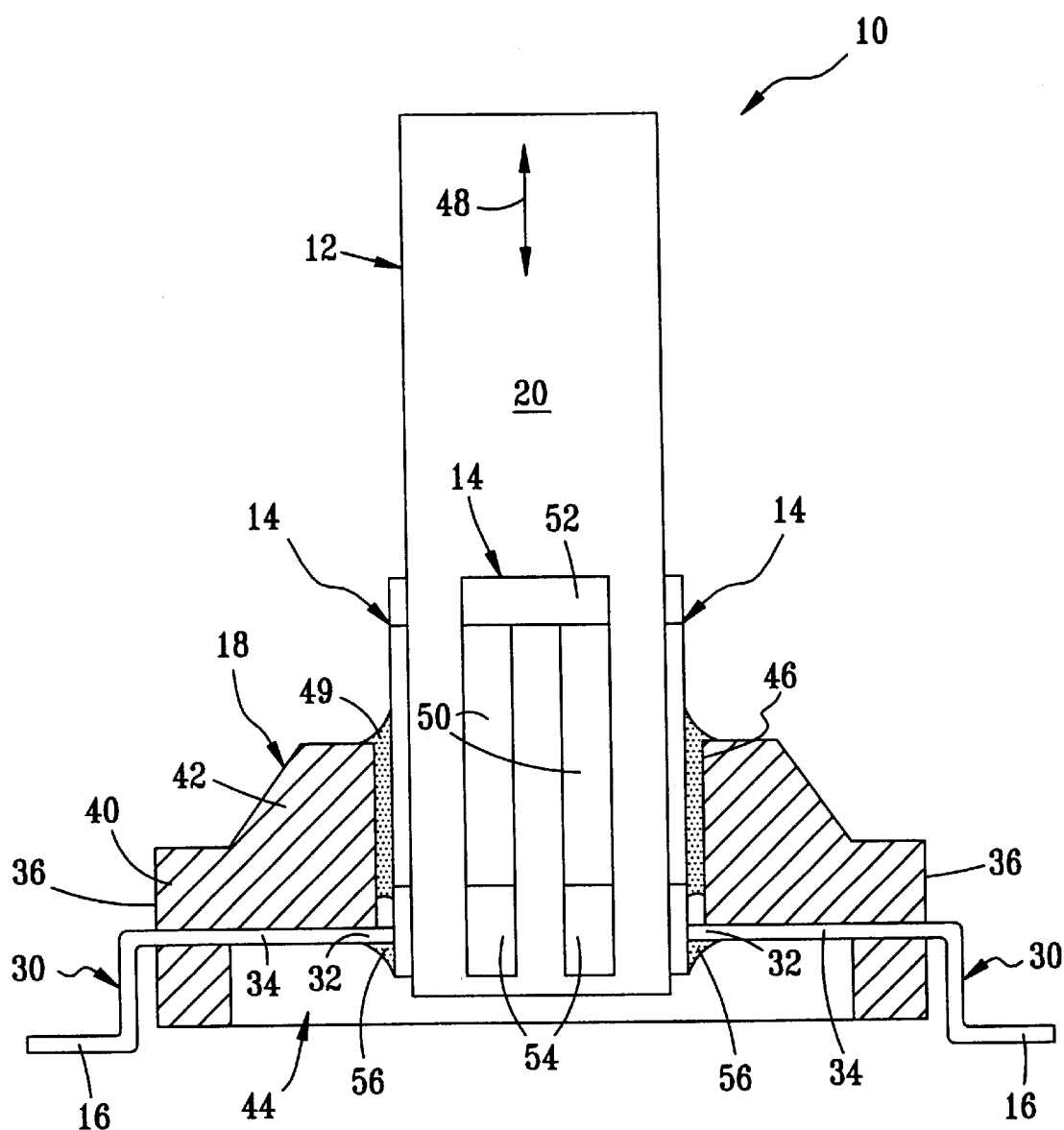
FIG. 6 is a cross sectional elevation view of the integrated pointing device of FIG. 1.

With reference now to FIG. 6, the body 18 comprises a base 40 and a collar 42 integrally formed with the base, although the collar may be formed separately and attached to the base through suitable adhesives, ultrasonic welding, or other well known bonding techniques. The base 40 is preferably generally square-shaped with four sides 36 and includes a cavity 44 formed in the base. The body 18 is preferably constructed of plastics material and the base 40 is molded around the middle section 34 of the leads 30 during an insert-molding process. Alternatively, the base 40 may be constructed of separate plastic sheet material bonded together with the leads 30 sandwiched therebetween. An opening 46 extends through the collar 42 and base 40 and is in communication with the cavity 44. The pointing stick 12 extends through the opening 46 in a Z-axis direction 48, and is held in place by a suitable adhesive material 49, such as a cyanoacrylate adhesive epoxy material. The particular adhesive used should be compatible with the materials of the pointing stick 12 and body 18.

The strain gauges 14 are mounted on the sides 20 of the stick 12. Each strain gauge comprises spaced pressure sensitive strips 50 that extend generally parallel to each other in the Z-axis direction 48, a conductive contact bridge 52 extending between the strips 50 at their upper end for electrically connecting the two strips 50, and a conductive contact pad 54 electrically connected to a lower end of each strip 50. Preferably, the conductive contact pads 54 are formed as lower extensions of the pressure sensitive strips 50.

The pressure sensitive strips 50 are formed of a material that exhibits a change in electrical properties, such as resistance, in response to the amount of strain applied thereto. Preferably, a resistive thick film material is screened onto the sides 20 of the pointing stick 12. Alternatively, a resistive thin film material can be sputtered onto the sides 20. The conductive bridge 52 and pad 54 are also adhered to the sides 20 in a well-known manner.

In an alternative arrangement, the strain gauges 14 can comprise a single pressure sensitive strip located between the contact bridge 52 and the contact pads 54.

With reference to FIGS. 5 and 6, leads 30 of a lead pair 38 are electrically connected to opposite ends of one of the strain gauges 14 (represented as R1, R2, R3 and R4 in FIG. 5) at their inner terminals 32, wherein a connected pair of strips 50 represents a single strain gauge 14. Each contact pad 54 is bonded to an aligned inner terminal 32 by any suitable bond material 50, such as tin-lead solder. In this manner, the outer terminals 16 are electrically connected to the strain gauges 14.

Since there are four outer terminals 16 associated with each strain gauge 14 in this embodiment, the printed circuit board 21 is formed with electrical traces that interconnect selected pairs of outer terminals 16. For example, as shown in FIGS. 4 and 5, traces 60 to 70 electrically connect one end of strain gauges R1 and R3 to a positive voltage source, while traces 72 to 82 electrically connect one end of strain gauges R2 and R4 to ground. Likewise, traces 84 and 86 connect the opposite end of strain gauge R3 to indicate strain in the positive X-axis direction; traces 88 and 90 connect the opposite end of strain gauge R1 to indicate strain in the positive Y-axis direction; traces 92 and 94 connect the opposite end of strain gauge R4 to indicate strain in the negative X-axis direction; and traces 96 and 98 connect the opposite end of strain gauge R2 to indicate strain in the negative Y-axis direction.

Figure 7:
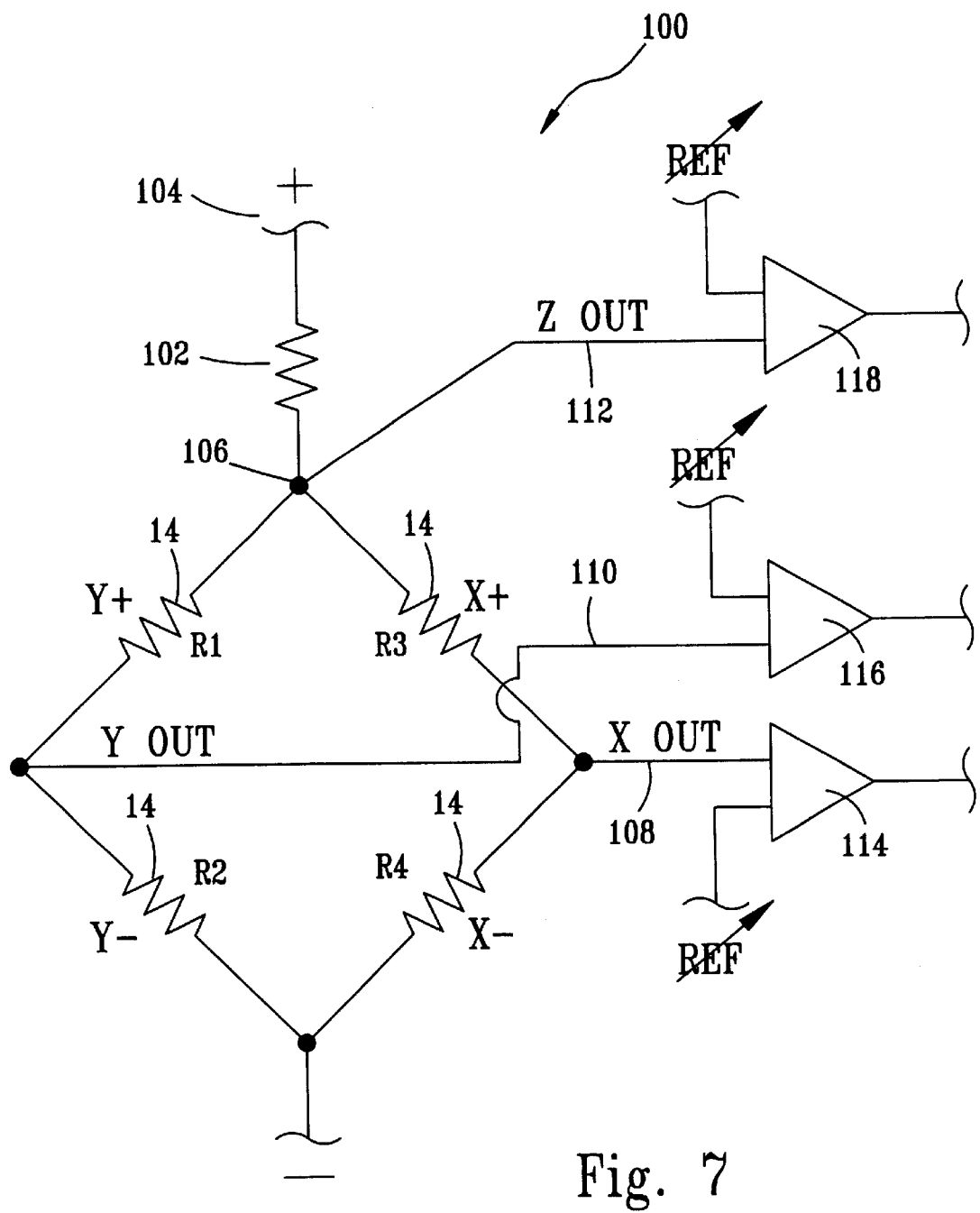
FIG. 7 is an electrical schematic of a bridge circuit incorporating the strain sensitive elements of the integrated pointing device.

Referring now to FIG. 7, an electrical schematic 100 of a bridge circuit incorporating the strain gauges 14 is shown. Specifically, this circuit is an example of how the Z-axis pointing stick can be arranged to interface with the electronics (not shown) on the circuit board 21. The strain gauges 14 on opposing sides of the stick 12 are configured in two half bridge circuits, resistors R1 (Y+) and R2 (Y−) form a first half bridge, while resistors R3 (X+) and R4 (X−) form the second half bridge. A fixed resistor 102 is connected between the supply voltage 104 of the system and a node 106. The X OUT output 108, Y OUT output 110, and Z OUT output 112 are amplified by three differential amplifiers 114, 116, and 118, respectively. Each amplifier has a variable reference voltage input. These reference voltages are calibrated to set the output to zero along each axis when no force is applied to the stick 12. The X and Y axis outputs 116 and 118 are developed when an X or Y directional force is applied to the stick 12. For example, when a force is applied in the X direction, the X− and X+ strain sensitive resistors change resistance in opposite directions and cause an output change. The same is true for the Y-axis. A Z-axis output is developed when a Z-axis force is applied to the top of the stick 12. Force in the Z-axis causes all strain gauge resistors 14 on the stick 12 to change in a negative direction. This change lowers the total impedance of the two half bridges. The lower bridge impedance causes a voltage change in the Z OUT output 112 since the series resistor 102 is fixed.

Figure 8:
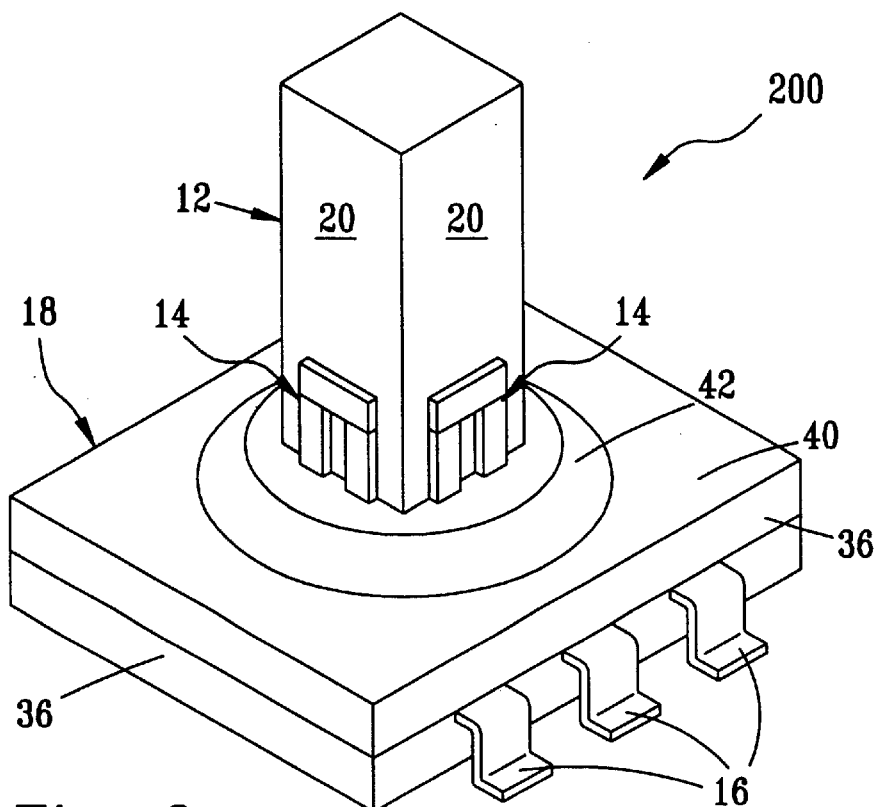
FIG. 8 is an isometric view of an integrated surface-mount pointing device according to a second embodiment of the invention.
Figure 9:
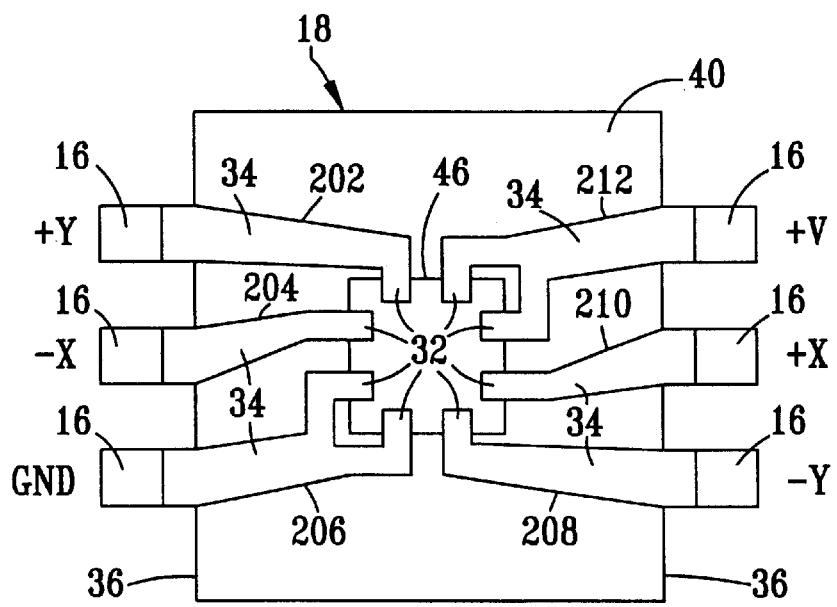
FIG. 9 is a cross sectional plan view of the integrated pointing stick of FIG. 8.

With reference now to FIGS. 8 and 9, an integrated surface-mounted pointing device 200 according to a further embodiment of the invention is illustrated, wherein like parts in the previous embodiment are represented by like numerals. As in the previous embodiment, the pointing device 200 comprises an upright pointing stick or shaft 12, strain gauges 14 located on the sides 20 of the stick 12, and a body 18 with a collar 42 and base 44. A total of six leads 202 to 212 are molded into the base 44. Each of the leads 202, 204, 208 and 210 comprises an outer terminal 16 and an inner terminal 32 separated by a middle section 34, while the leads 206 and 212 comprises an outer terminal 16 and a pair of inner terminals 32. Each of the inner terminals preferably extends into the opening 46 in the body 18, but can terminate at the edge of the opening or proximal thereto. Three leads 202, 204 and 206 are arranged on one side of the body 18, while the remaining leads 208, 210 and 212 are arranged on the opposite side of the body 18.

The connection of the leads to the strain gauges 14 is similar to that shown in FIG. 5, with the exception that the lead 212 is connected between a positive voltage source and one end of strain gauges R1 and R3 through its pair of inner terminals 32, and the lead 206 is connected between ground and one end of strain gauges R2 and R4 through its pair of inner terminals 32. Likewise, the lead 210 is connected to the opposite end of strain gauge R3 to indicate strain in the positive X-axis direction; the lead 202 is connected to the opposite end of strain gauge R1 to indicate strain in the positive Y-axis direction; the lead 204 is connected to the opposite end of strain gauge R4 to indicate strain in the negative X-axis direction; and the lead 208 is connected to the opposite end of strain gauge R2 to indicate strain in the negative Y-axis direction. With this arrangement, the separate traces on the circuit board of the previous embodiment, as schematically represented in FIG. 4, can be eliminated. The electrical schematic as shown in FIG. 7 can remain the same for this embodiment.

Remarks About the Preferred Embodiments

One of ordinary skill in the arts of strain gages and ceramic materials, and more particularly the art of designing pointing sticks with strain gages on the sides, will realize many advantages from using the preferred embodiment. In particular, strain gages are devices that sense the amount and direction of applied pressure placed upon the pointing stick. The sensed pressure creates electrical output signals used to direct the cursor on a display device. Thus, the side-mounted strain gages enables control of both the direction of cursor movement and the selection of items on the display device by tapping the pointing stick like the clicking of a mouse button. Of course, a skilled artisan will realize that the body 18 may have some flexure in a downward direction during the application of tapping force, especially with the cavity 44 arranged around the stick. Specifically, the flexing of the body 18 around the cavity will cause some force to be applied to the sensor from the top portion of the walls of the opening 46. However, the stick and sensor design can equally work without a cavity or flexure of the base side walls by simply sensing the strain created in the stick 12.

It will be noted that the collar 42 shifts the region of highest strain from the base 44 to the top of the collar 42 so that the maximum strain coincides with the resistor strips 50. With this arrangement, the entire length of the stick can be shortened. Specifically, when the stick 12 is shortened, there is a decrease in the amount of strain generated along the stick 12 when a person pushes the pointing stick with the finger. With the addition of the collar 42, the strain gauges 14 are now capable of sensing enough strain to be able to generate detectable and understandable electrical signals representative of the applied strain.

Additionally, a skilled artisan will understand that the strain gages may be made of thick film piezo-resistive material, which can be applied using known screen techniques.

It is further noted that a skilled artisan would realize that the pointing device 10 is now capable of performing selection and dragging of icons on a monitor in addition to double clicking for selection of an item. In this operation, the user would hold down the pointing stick 12 while exerting additional force in the X-Y plane for controlling the direction of the icon being dragged. All of these functions are now capable of being performed with a single finger while the remaining fingers are located on the keyboard.

The above-described embodiments can be constructed with the same dimensions and lead pitches as standard commercially available IC packages. The compact size would allow for its use in a wide variety of applications, while the minimal parts and ease of assembly of the above-described embodiments also renders the device relatively inexpensive to produce.

Variations of the Preferred Embodiment(s)

One of ordinary skill in the art of making pointing devices will realize that there are many different ways of accomplishing the preferred embodiment. For example, although the bonding compound 49 is illustrated between the body 18 and the stick 12, it may not be required when the opening 46 is sized to fit securely around the stick 12.

Even though the embodiments are discussed in conjunction with the use of strain gages on all four sides of the stick 12, it is contemplated that only two sides of the stick 12 can be used for sensing only either the positive or negative strain on the bending of the stick for creating the resulting control signals.

It is to be understood that the X, Y, and Z axes, as well as the terms upper, lower, etc., and their respective derivatives as used herein are intended to describe relative, rather than absolute directions and/or positions.

While the invention has been taught with specific reference to these embodiments, someone skilled in the art will recognize that changes can be made in form and detail without departing from the spirit and the scope of the invention. The describe embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. An integrated, surface-mount pointing device for controlling the movement of an object on a display screen, comprising;
   a) a base member;
   b) a shaft having a first end and a second end, with the first end mounted in the base member;
   c) a first sensor mounted on the shaft for sensing the amount of strain in the shaft that is created in response to an applied force on the shaft in at least a first direction; and,
   d) a first pair of spaced electrical leads embedded in the base member and extending at least partially therethrough, each electrical lead having an inner terminal end electrically connected to the first sensor, and an outer terminal end extending outwardly of the base member and being shaped for mounting on the surface of a circuit board.

2. An integrated, surface-mount pointing device according to claim 1, and further comprising:
   a) a second sensor mounted on the shaft for sensing the amount of strain the shaft in response to an applied force on the shaft in a second direction substantially transverse to the first direction; and
   b) a second pair of spaced electrical leads embedded in the base member and extending at least partially therethrough, each electrical lead of the second pair having an inner terminal end electrically connected to the second sensor and an outer terminal end extending outwardly of the base member, the outer terminal ends of the second pair of leads being shaped for mounting on the surface of a circuit board.

3. An integral, surface-mount pointing device according to claim 2, and further comprising:
   a) third and fourth sensors mounted on the shaft opposite the first and second sensors, respectively; and
   b) third and fourth pairs of spaced electrical leads embedded in the base member and extending at least partially therethrough, each electrical lead of the third and fourth pairs having an inner terminal end electrically connected to the third and fourth sensors, respectively, and an outer terminal end extending outwardly of the base member, the outer terminal ends of the third and fourth pairs of leads being shaped for mounting on the surface of a circuit board.

4. An integrated, surface-mount pointing device according to claim 3, wherein each lead has a plurality of outer terminal ends.

5. An integrated, surface-mount pointing device according to claim 2, and further comprising:
   a) third and fourth sensors mounted on the shaft opposite the first and second sensors, respectively; and
   b) a third pair of electrical leads embedded in the base member and extending at least partially therethrough, each electrical lead of the third pair having an inner terminal end electrically connected to one of the third and fourth sensors, and an outer terminal end extending outwardly of the base member, the outer terminal ends of the third pair of leads being shaped for mounting on the surface of a circuit board.

6. An integrated, surface-mount pointing device according to claim 5, wherein the inner terminal end of an electrical lead from the first pair of electrical leads comprises first and second inner terminal ends, the first inner terminal end being connected to the fourth sensor and the second inner terminal end being connected to the first sensor.

7. An integrated, surface-mount pointing device according to claim 6, wherein the inner terminal end of an electrical lead from the second pair of electrical leads comprises first and second inner terminal ends, the first inner terminal end of the electrical lead of the second pair being connected to the second sensor and the second inner terminal end of the electrical lead of the second pair being connected to the fourth sensor.

8. An integrated, surface-mount pointing device according to claim 1, wherein each lead has a plurality of outer terminal ends.

9. An integrated, surface-mount pointing device according to claim 5, wherein the shape of the outer terminal ends is selected from the group of gull-wing, J-lead, and butt terminal shapes.

10. An integrated, surface-mount pointing device according to claim 1, wherein the shape of the outer terminal ends is selected from the group of gull-wing, J-lead, and butt terminal shapes.

11. A keyboard for entering data in an information system, comprising:
   a) at least two keys located on the keyboard;
   b) a shaft, located between the at least two keys and extending upward toward a top surface of the keys;
   c) a first sensor mounted on the shaft for sensing the amount of strain in the shaft in response to an applied force on the shaft in at least a first direction;
   d) a circuit board mounted in the keyboard in the vicinity of the two keys;
   e) a base member positioned below the at least two keys, with a lower end of the shaft being mounted in the base member; and
   f) a first pair of spaced electrical leads embedded in the base member and extending at least partially therethrough, each electrical lead having an inner terminal end electrically connected to the first sensor and an outer terminal end extending outwardly from the base member and being mounted on a surface of the circuit board.

12. A keyboard according to claim 11, wherein the circuit board comprises:
   a) an input trace connected to one of the electrical leads for coupling the sensor to a voltage source; and
   b) an output trace connected to the other of the electrical leads for outputting signals indicative of strain on the shaft in at least the first direction.

13. A keyboard according to claim 12, wherein the circuit board further comprises electronic circuitry connected to the output trace for processing the signals indicative of strain.

14. A keyboard according to claim 11, ad further comprising:
   a) a second sensor mounted on the shaft for sensing the amount of strain in the shaft in response to an applied force on the shaft in a second direction substantially transverse to the first direction; and b) a second pair of spaced electrical leads embedded in the base member and extending at least partially therethrough, each electrical lead of the second pair having an inner terminal end electrically connected to the second sensor and an outer terminal end extending outwardly of the base member, the outer terminal ends of the second pair of leads being mounted on the surface of the circuit board.

15. A keyboard according to claim 14, wherein the circuit board comprises:

a) an input trace connected to one of the electrical leads of each of the first and second pairs of electrical leads for coupling the first and second sensors to a voltage source; and b) an output trace connected to each of the other of the electrical leads of the first and second pairs of electrical leads for outputting signals indicative of strain on the shaft in at least the first and second directions.

16. A keyboard according to claim 15, wherein the circuit board further comprises electronic circuitry connected to the output traces for processing the signals indicative of strain in at least the first and second directions.

17. A keyboard according to claim 16, wherein the circuit board further comprises electronic circuitry connected to the output traces for processing the signals indicative of strain in a third direction substantially transverse to the first and second directions.

18. A keyboard according to claim 15, and further comprising:

a) third and fourth sensors mounted on the shaft opposite the first and second sensors, respectively; and b) third and fourth pairs of spaced electrical leads embedded in the base member and extending at least partially therethrough, each electrical lead of the third and fourth pairs having an inner terminal end electrically connected to the third and fourth sensors, respectively, and an outer terminal end extending outwardly of the base member, the outer terminal ends of the third and fourth pairs of leads being mounted on the surface of the circuit board.

19. A keyboard according to claim 18, wherein the circuit board further comprises:

a) a trace connected to one of the electrical leads of each of the third and fourth pairs of electrical leads for coupling the first and second sensors to ground; and b) an output trace connected to each of the other of the electrical leads of the third and fourth pairs of electrical leads for outputting signals indicative of strain on the shaft in third and fourth directions opposite the first and second directions, respectively.

20. A keyboard according to claim 19, wherein the circuit board further comprises electronic circuitry connected to the output traces for processing the signals indicative of strain in at least the first, second, third and fourth directions.

* * * * *